United States Patent Office 2,743,895
Patented May 1, 1956

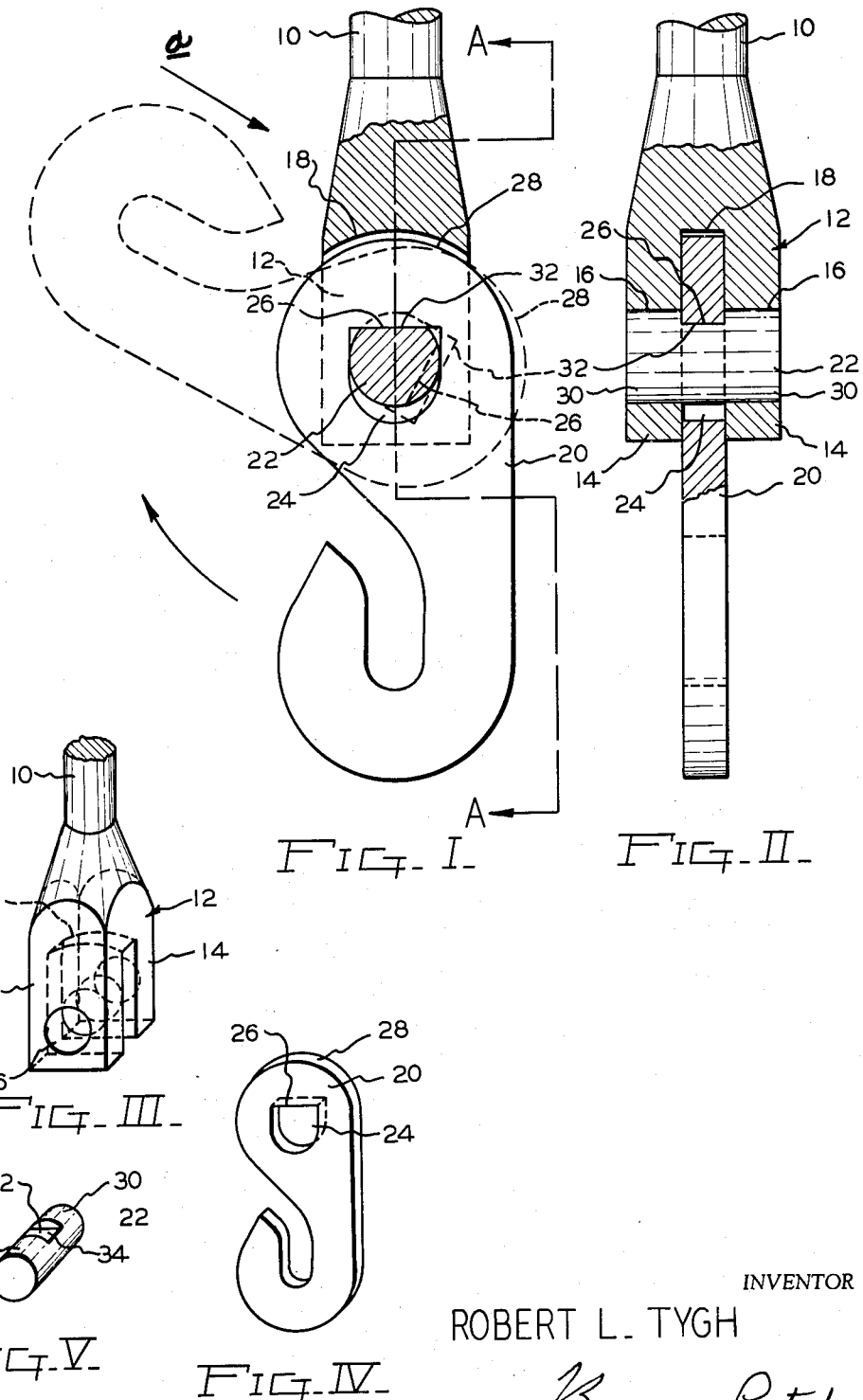

2,743,895

SWING HOOK

Robert L. Tygh, Clarklake, Mich.

Application January 20, 1950, Serial No. 139,560

4 Claims. (Cl. 248—341)

This invention relates to swing hooks or joints, such as are employed for instance to suspend children's swings, but which have wider and more general application wherever a similar swinging condition is required.

An object of the invention is to provide a swing joint which involves a safety feature to prevent the hook or like swinging part from becoming detached from its bearing structure during normal conditions of use, or operation.

Another object of the invention is to provide a swing hook which involves an improved bearing arrangement, by which the swinging hook or like part is relieved of wear and by which increased bearing area is provided.

The above and other objects and advantages of the invention will apear clear from consideration of the following description of one practical form of the invention, given by way of example with reference to the drawings and defined in the appended claims.

In the drawings:

Fig. I is a part sectional elevational view of one form of the invention,

Fig. II is a section on the line A—A of Fig. I,

Fig. III is a fragmentary perspective view, on a reduced scale, of the yoke end of the hook support, Fig. IV is a perspective view of the hook, and Fig. V is a perspective view of the bearing pin.

Referring to the drawings, the rod 10, which is adapted to be secured in position upon a suitable supporting structure, such as the cross bar of a swing frame or support, has a yoke 12 at its lower end, the side limbs 14 of which are aligned circular openings 16, and the inside surface 18 of the base of which yoke presents an abutment surface to the top of a hook 20 when the latter is mounted upon a fulcrum pin engaged in said openings 16 and in an opening 24 in the hook.

The hook opening 24 has a squared surface 26 abridging an otherwise U-shape opening the circular base of which is on the same radius as that of the circular openings 16, but is eccentric to the radiussed hook surface 28.

The fulcrum pin 22 has cylindrical end portions 30, which have a bearing fit in the yoke openings 16, and a central portion with a transverse surface recess 32, which presents a squared anchor surface 34 for engagement by the squared surface 26 of the hook opening when the parts are assembled for operation and the hook 20 is subjected to load.

To assemble the parts, the hook 20 is required to be swung into a position inclined upwardly somewhat to the horizontal, as shown in dotted lines in Fig. I, whereby to bring the circular yoke openings 16 into register with the radiussed end portion of the hook opening 24, such that the fulcrum pin 22 can be entered into position, with its square surfaced anchor recess 32 located to register with the squared hook opening surface 26. With the parts so assembled the hook can be swung downwardly into its normal assembled position, in which the hook hangs vertically with its squared opening surface 26 engaged in the fulcrum pin anchor recess 32 by a corresponding relative lowering movement of the hook when the same is subjected to load. Also in this upwardly inclined position the hook pivot pin can be removed since in this position the hook can be pushed downwardly in the direction of the arrow $a$ to clear the abutment surface 18 as the squared hook surface opening 26 is removed from engagement with the recess 32. In any other position of the hook such removal is not possible since the hook surface 28 would then be pushed adjacent and face the yoke surface 18.

Due to the mutual engagement of the squared surfaces 26 and 34, the fulcrum pin and the hook become united to swing as one, with the end portions 30 of the fulcrum pin rotating within the yoke openings 16. Thus, there is no relative swinging movement between the hook and the fulcrum pin, which latter is accordingly relieved of wear on this account, whereas the duplicated bearing surfaces 16 and 30 provide a correspondingly increased bearing area with its attendant advantage, as to the distribution of wear.

With the hook engaged in the recess 32, the hook is held thus engaged due to the overhead eccentric yoke abutment surface 18 and the fulcrum pin cannot be removed until the hook is swung back into the dotted line position to register the yoke openings 16 with the radiussed end portion of the hook opening, thereby providing an important safety feature since the hook is thus held positively united to the rod 10 and cannot be removed therefrom during the normally traversed swinging angle, the point at which removal of the fulcrum pin is possible being at an abnormal angle such as would not occur during the normal swinging movement of the hook.

I claim:

1. A swing joint comprising a first joint part having a pair of spaced opposed legs having aligned circular openings therethrough, a cylindrical pivot pin rotatable in said openings and having a medial transverse chordal recess, and a second joint part rotatable with said pivot pin between said legs and having a transverse hole therethrough of which all the dimensions are at least as great as the diameter of said pivot pin, said hole being bounded on a side thereof by a flat surface adapted to contact the bottom of said chordal recess so that said pivot pin and second joint part will turn together as a unit in operation.

2. The invention of claim 1, in which said first joint part has a first arcuate surface between said legs concentric with said openings and said second joint part has a second arcuate surface on the same side thereof as said flat surface, said second arcuate surface being of lesser radius than said first arcuate surface and being concentric with said openings when said flat surface is seated in said recess, a portion of said second arcuate surface lying outside the radius of said first arcuate surface when said flat surface is disengaged from said recess to oppose removal of said flat surface from said recess except when said joint parts are swung into critical position relative to each other.

3. A swing joint comprising a first joint part having a pair of spaced opposed legs having aligned circular holes therethrough, a cylindrical pivot pin rotatable in said openings and having a medial transverse recess, said pivot pin having a first abutment surface lying wholly within said recess and extending longitudinally of said recess, and a second joint part rotatable with said pivot pin between said legs and having a transverse hole therethrough of which all the dimensions are at least as great as the diameter of said pivot pin, said hole being bounded on a side thereof by a second abutment surface complementary to and adapted to contact said first abutment surface to prevent relative rotation of said pivot pin and second joint part so that said pivot pin and second joint part will turn together as a unit in operation.

4. The invention of claim 3, in which said first joint part has a first arcuate surface between said legs concentric with said openings and said second joint part has a second arcuate surface on the same side thereof as said second abutment surface, said second arcuate surface being of lesser radius than said first arcuate surface and being concentric with said openings when said second abutment surface is seated in said recess, a portion of said second arcuate surface lying outside the radius of said first arcuate surface when said second abutment surface is disengaged from said recess to oppose removal of said second abutment surface from said recess except when said joint parts are swung into critical position relative to each other.

References Cited in the file of this patent

UNITED STATES PATENTS

| Number | Name | Date |
|---|---|---|
| 352,469 | Kranz | Nov. 9, 1886 |
| 618,086 | Haase | Jan. 24, 1899 |
| 737,360 | Daly | Aug. 25, 1903 |
| 1,285,227 | Kinney | Nov. 19, 1918 |
| 1,388,132 | Walp et al. | Aug. 16, 1921 |
| 1,781,072 | Neidhammer | Nov. 11, 1930 |
| 2,010,124 | Worrall | Aug. 6, 1935 |